US011893516B2

(12) United States Patent
Molinari et al.

(10) Patent No.: US 11,893,516 B2
(45) Date of Patent: Feb. 6, 2024

(54) WAIT TIME RECOMMENDER

(71) Applicant: Universal City Studios LLC, Universal City, CA (US)

(72) Inventors: Michael Joseph Molinari, Orlando, FL (US); Daniel Joseph Salowe, Orlando, FL (US); Sarah Heayun Whang, Orlando, FL (US); Joshua David Lecas, Orlando, FL (US)

(73) Assignee: Universal City Studios LLC, Universal City, CA (US)

( * ) Notice: Subject to any disclaimer, the term of this patent is extended or adjusted under 35 U.S.C. 154(b) by 1111 days.

(21) Appl. No.: 16/150,106

(22) Filed: Oct. 2, 2018

(65) Prior Publication Data

US 2020/0104757 A1 Apr. 2, 2020

(51) Int. Cl.
 *G06Q 10/02* (2012.01)
 *G06Q 10/04* (2023.01)
 (Continued)

(52) U.S. Cl.
 CPC ............. *G06Q 10/02* (2013.01); *G06Q 10/04* (2013.01); *G07C 11/00* (2013.01); *H04L 51/02* (2013.01);
 (Continued)

(58) Field of Classification Search
 CPC .. G06Q 10/02; G06Q 10/025; G06Q 30/0261; G06Q 10/04; G06Q 10/06; G06Q 10/06311; G06Q 10/06312; G06Q 50/12; G06Q 30/0631; G06Q 30/02; G06Q 30/0206; G06Q 30/0601; G06Q 50/14; G06Q 10/087; G06Q 50/205; G06Q 30/0641; G06Q 50/26; G06Q 20/203;
 (Continued)

(56) References Cited

U.S. PATENT DOCUMENTS

2004/0111541 A1 6/2004 Meyer et al.
2004/0158482 A1 8/2004 Hale et al.
(Continued)

FOREIGN PATENT DOCUMENTS

JP 2001147965 A 5/2001
JP 2003315435 A 11/2003
(Continued)

OTHER PUBLICATIONS

6. Ohwada, H., Okada, M., & Kanamori, K. (2013). Flexible route planning for amusement parks navigation (Year: 2013).*
(Continued)

*Primary Examiner* — Maria C Santos-Diaz
(74) *Attorney, Agent, or Firm* — Fletcher Yoder, P.C.

(57) ABSTRACT

Systems and methods are disclosed that determine whether wait times for attractions of a theme park are shorter or longer than expected and notify guests of these shorter or longer wait times. In particular, the systems and methods determine a wait time value for an attraction by dividing a wait time for the attraction by a total wait time for all attractions of the theme park, and compare the wait time value to one or more threshold values based on an expected wait time for the attraction. In this manner, theme park guests may make a more informed decision on which attraction to wait for, and maximize their time at the theme park.

17 Claims, 7 Drawing Sheets

(51) Int. Cl.
    *H04L 51/02* (2022.01)
    *G07C 11/00* (2006.01)
    *H04L 67/55* (2022.01)

(52) U.S. Cl.
    CPC .......... *H04L 67/55* (2022.05); *G07C 2011/02* (2013.01); *G07C 2011/04* (2013.01)

(58) Field of Classification Search
CPC .......... G06Q 30/0283; G06Q 30/0633; G06Q 30/08; G06Q 10/0631; G06Q 10/103; G06Q 20/387; G06Q 30/0277; G06Q 40/03; G06Q 50/01; G06Q 50/02; G06Q 50/30; G06Q 10/043; G06Q 10/047; G06Q 10/06314; G06Q 10/06315; G06Q 10/06393; G06Q 10/10; G06Q 10/101; G06Q 20/123; G06Q 20/18; G06Q 20/20; G06Q 20/3224; G06Q 20/3678; G06Q 20/4015; G06Q 30/0202; G06Q 30/0207; G06Q 30/0209; G06Q 30/0215; G06Q 30/0232; G06Q 50/06; G06Q 10/063; G06Q 10/06313; G06Q 10/067; G06Q 10/1095; G06Q 20/382; G06Q 30/0208; G06Q 30/0212; G06Q 30/0224; G06Q 30/0225; G06Q 30/0242; G06Q 30/0244; G06Q 30/0246; G06Q 30/0251; G06Q 30/0254; G06Q 30/0255; G06Q 30/0256; G06Q 30/0269; G06Q 30/0271; G06Q 30/0282; G06Q 30/0643; G06Q 50/10; G06Q 50/22; G07C 2011/02; G16H 40/20; H04L 47/50; H04L 47/70
See application file for complete search history.

(56) References Cited

U.S. PATENT DOCUMENTS

| | | | |
|---|---|---|---|
| 2005/0045710 A1 | 3/2005 | Burke | |
| 2008/0267107 A1* | 10/2008 | Rosenberg | H04H 20/61 370/312 |
| 2009/0063205 A1 | 3/2009 | Shibasaki | |
| 2009/0216547 A1 | 8/2009 | Canora et al. | |
| 2009/0281817 A1* | 11/2009 | Ferrara | G06Q 30/02 705/1.1 |
| 2010/0063854 A1 | 3/2010 | Purvis et al. | |
| 2010/0277276 A1* | 11/2010 | Bayne | G07C 9/27 340/5.21 |
| 2012/0116789 A1* | 5/2012 | Boss | G06Q 10/06 705/1.1 |
| 2012/0116863 A1 | 5/2012 | Boss et al. | |
| 2014/0132400 A1* | 5/2014 | Heaven | H04W 4/50 340/12.5 |
| 2015/0177006 A1* | 6/2015 | Schulz | H04W 4/024 701/537 |
| 2015/0336013 A1* | 11/2015 | Stenzler | G06K 9/00771 700/90 |
| 2016/0055429 A1* | 2/2016 | Schwartz | G06Q 10/02 705/5 |
| 2016/0321548 A1 | 11/2016 | Ziskind et al. | |
| 2016/0321618 A1 | 11/2016 | Scheja et al. | |
| 2017/0039661 A1 | 2/2017 | Vanslette et al. | |
| 2017/0169449 A1* | 6/2017 | Heaven | G06Q 30/0203 |
| 2017/0178084 A1 | 6/2017 | Barreira Avegliano et al. | |
| 2018/0017406 A1* | 1/2018 | Semnani | G01C 21/206 |
| 2018/0129984 A1 | 5/2018 | Polk et al. | |
| 2018/0240161 A1* | 8/2018 | Cronin | G06Q 30/0281 |
| 2018/0247270 A1 | 8/2018 | Cronin et al. | |
| 2019/0244142 A1* | 8/2019 | Singh | H04W 4/40 |
| 2019/0340544 A1* | 11/2019 | Jaffe | G06Q 50/30 |

FOREIGN PATENT DOCUMENTS

| | | | |
|---|---|---|---|
| JP | 2005189921 A | 7/2005 | |
| JP | 2018112928 A | 7/2018 | |
| WO | 2007004370 A1 | 1/2007 | |
| WO | WO-2007004370 A1 * | 1/2007 | ............. G06Q 10/00 |
| WO | WO-2015148695 A1 * | 10/2015 | ............. G06Q 10/02 |
| WO | WO-2019193309 A1 * | 10/2019 | ............. G06Q 10/02 |

OTHER PUBLICATIONS

Daniels, E. C. (2016). The perception of time waiting in theme park queue lines (Order No. 10107898). Available from ProQuest Dissertations and Theses Professional. (1792069046) (Year: 2016).*
PCT/US2019/054074 International Search Report and Written Opinion dated Nov. 14, 2019.
JP Japanese Office Action Application No. 2021-518619 dated Oct. 2, 2023.

* cited by examiner

WAIT TIME RECOMMENDER

BACKGROUND

The present disclosure relates generally to wait times for attractions. More specifically, embodiments of the present disclosure relate to determining wait times for attractions that are shorter or longer than expected and notifying guests of these shorter or longer wait times.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Many venues or service providers, such as theme parks, restaurants, ticket sellers, governmental agencies, and the like, may include lines or queues for customers to acquire services. For example, a theme park may include multiple attractions, each with at least one line. Each line of each attraction may include a respective wait time. Guests of the theme park may decide which attraction to attend based on a number of factors, including preference of the attraction, distance to the attraction, time of day, weather, and wait time (or length) of the respective line. In some cases, the respective wait times may be provided via a software application on a guest's mobile device, though any suitable device may be used to display or communicate the respective wait times, such as signage inside of the theme park, signage at each attraction, a posting on a web site associated with the theme park, or messaging via chat bot on a messaging platform.

However, a guest may make a better informed decision as to which attraction to attend if more information were available, such as whether the wait time of the respective line is shorter or longer than a typical or expected wait time.

SUMMARY

Certain embodiments commensurate in scope with the originally claimed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

The present disclosure provides systems and methods that determine whether wait times for attractions are shorter or longer than expected and notify guests of these shorter or longer wait times. In particular, a theme park may include multiple attractions, each with at least one line. Each line of each attraction may thus include or be associated with a respective wait time at a given time. Guests may be informed of respective wait times via a software application on a guest's mobile device that may display information and tools related to the theme park, such as operating hours, status of attractions, and wait times for the attractions, though any suitable device may be used to display or communicate this information, such as signage inside of the theme park, signage at each attraction, posting on a web site associated with the theme park, or messaging via chat bot on a messaging platform.

A wait time recommendation system may use wait time historical data that includes wait times for attractions within the park and that are used to determine historical, expected, or typical wait times for individual attractions. These wait times may be provided per attraction and/or as a percentage of a total collective wait time of all attractions. In one embodiment, an expected wait time may be expressed as an expected ratio or percentage of total wait time for the park that is represented by an individual attraction (e.g., 5-7% of an expected total wait time for the park may be represented by a single attraction). Wait time recommendation logic of the wait time recommendation system may determine a current or existing wait time value.

In one embodiment, a wait time value for the attraction based on a relationship between the existing wait time for an individual attraction and the total existing wait time for all attractions in the theme park. The existing wait times of the attractions, or the calculated wait time values representative of a relationship between the existing wait time of an attraction relative to a total existing wait time of all attraction, may be compared to historical data to determine if any individual attractions are outside of expected bounds, e.g., have longer or shorter wait times than expected. For example, if an individual attraction is typically representative of at least 5% of a typical total park wait time, an existing wait time that represents less than 5% of the current total park wait time may be considered a shorter than expected wait time. In another embodiment, existing wait times may be compared directly to historical wait times having a given context to assess whether an existing wait time is shorter or longer than expected. That is, rather than comparing an existing wait time to an overall average historical wait time, the historical wait time used in the comparison may be selected from a same-day or same-park-crowd (e.g., using total park guests for the day) subset of data points.

If the wait time recommendation logic determines that the wait time value is less than a short wait time threshold value (e.g., ratio or percentage), the wait time recommendation logic may send a notification to the software application on the guest's mobile device that the wait time is shorter than expected. If the wait time recommendation logic determines that the wait time value is greater than a long wait time threshold value (e.g., ratio or percentage), the wait time recommendation logic may send a notification to the software application on the guest's mobile device that the wait time is longer than expected. The short wait time threshold value and the long wait time threshold value may be based on an expected wait time ratio for the attraction. The expected wait time value may be determined based on historical wait time data of the attraction and the theme park, date or time information (such as the time of day, the day of the week, the week of the year, or the season), weather, a characteristic of the attraction (such as whether the attraction is outdoor or indoor), whether the attraction is open or closed (e.g., for a range of time), or holiday or event dates (e.g., public holidays such as Thanksgiving or Christmas, school holidays such as spring break, or religious holidays such as Easter). The guest may then use the notification of whether the wait time is shorter or longer than expected as a factor in deciding whether to wait in a line for an attraction.

In one embodiment, a wait time recommendation system includes a processor, a memory, and communication circuitry. The memory stores instructions that, when executed by the processor, cause the processor to receive existing wait times of attractions of a theme park and determine a wait time value based on a relationship between an existing wait time of an individual attraction and an existing total wait time of the attractions of the theme park. The instructions also cause the processor to generate a wait time recommendation for the individual attraction based on a comparison of the wait time value and a wait time threshold value of the individual attraction. The communication circuitry may then send an indication of the wait time recommendation to a wait time recommendation software application of a mobile device.

In another embodiment, a tangible, non-transitory, computer-readable medium includes instructions for generating a wait time recommendation for an attraction of a theme park. The instructions, when executed by a processor, cause the processor to receive a total wait time for attractions of the theme park, receive a wait time for the attraction, and compare the wait time or a wait time value for the attraction to a threshold value associated with the attraction. The wait time value is based on the total wait time and the wait time for the attraction. The instructions also cause the processor to send a notification based on the comparison.

In yet another embodiment, a method for generating a wait time recommendation includes receiving wait times of attractions of a theme park, and determining, based on the wait times, a wait time value of each individual attraction. The method also includes comparing the wait time value of each individual attraction to a wait time threshold value of each individual attraction, and identifying a subset of the attractions having wait time values indicative of a shorter than expected wait time based on the comparison. The method further includes sending a notification that includes an indication of the subset.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

The present disclosure provides systems and methods that determine wait times for attractions that are shorter or longer than expected and notify guests of these shorter or longer wait times. In particular, a theme park may include multiple attractions, each with at least one line. Each line of each attraction may thus include a respective wait time. The respective wait times may be provided to the guest, e.g., via a software application on a guest's mobile device or display boards within the theme park. In some cases, the theme park may provide a software application to guests that may display information and tools related to the theme park, such as operating hours, status of attractions, and wait times for the attractions.

A wait time recommendation system may provide a notification upon determining that a wait time for an attraction is shorter or longer than expected by, for example, comparing the wait time for the attraction to wait time historical data for the attraction. The wait time historical data may take into account date or time information (such as the time of day, the day of the week, the week of the year, or the season), weather, a characteristic of the attraction (such as whether the attraction is outdoor or indoor), whether the attraction is open or closed (e.g., for a range of time), holiday or event dates (e.g., public holidays such as Thanksgiving or Christmas, school holidays such as spring break, or religious holidays such as Easter), weather information (e.g., related to temperature, humidity, chance or amount of rain, chance of natural disaster, or the like), a parade, show, or other performance occurring nearby, or any other suitable information that may affect or skew wait time. The guest may then use the notification of whether the wait time is shorter or longer than expected as a factor in deciding whether to wait in a line for an attraction. In this manner, the guest may make a more informed decision on which attraction to wait for, and maximize their time at the theme park. Moreover, theme park operation may be more efficient as guests may be more evenly distributed among the attractions. That is, the disclosed techniques may alert guests if one or more attractions are underserved, thus encouraging redistribution of guests to the one or more underserved attractions. It should be noted that, while the present disclosure describes embodiments for theme parks and attractions, the presently disclosed systems and methods may be applied to any suitable venue for line wait time analysis, such as restaurants, ticket sellers, governmental agencies, and the like.

The disclosed techniques provide improved context for wait time estimates for guests. For example, if a wait time for a particular ride is 35 minutes, that may be longer than expected for that ride if the park is relatively empty or on a rainy day, but may be shorter than expected on a crowded day/sunny day. Further, ranking rides by estimated wait times does not provide guests with information as to which rides tend to be more crowded or which are more popular. By providing a quality assessment of a wait time (e.g., shorter than expected, longer than expected) on a per-ride basis, guests may determine which rides are a good value and may enjoy the feeling of getting a bargain on wait times, even for rides with absolute wait times that are long relative to other rides in the park, thus improving the guest experience and customer satisfaction.

Figure 1:
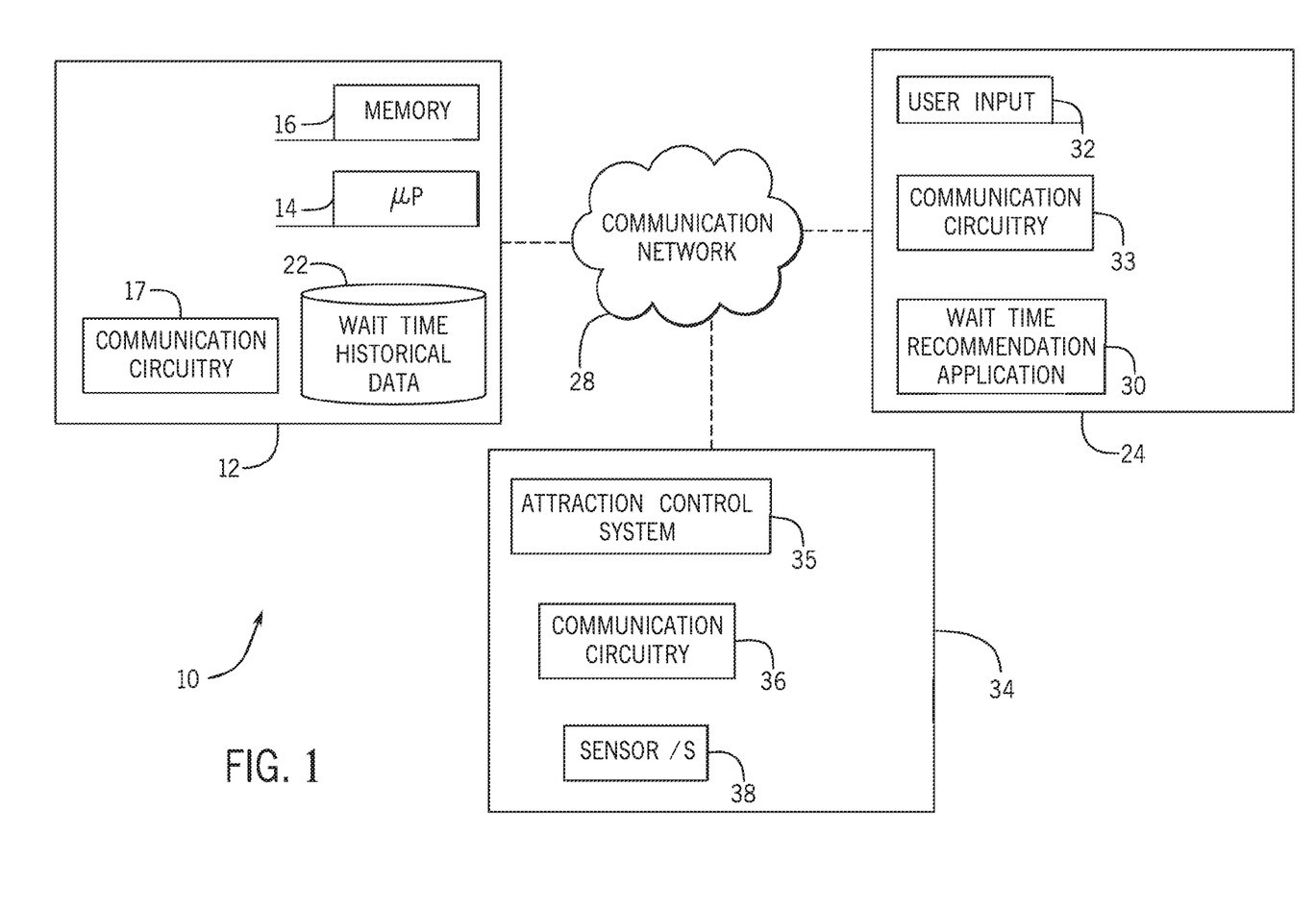
FIG. 1 is a block diagram of a wait time recommendation system, according to embodiments of the present disclosure.

FIG. 1 is a block diagram of a wait time recommendation system 10, according to embodiments of the present disclosure. The wait time recommendation system 10 includes a controller 12 that includes one or more processors 14 and one or more memory devices 16. The processor 14 may execute software programs and/or instructions to determine a wait time recommendation. Moreover, the processor 14 may include multiple microprocessors, one or more "general-purpose" microprocessors, one or more special-purpose microprocessors, and/or one or more application specific integrated circuits (ASICS), and/or one or more reduced instruction set (RISC) processors. The memory device 16 may include one or more storage devices, and may store machine-readable and/or processor-executable instructions (e.g., firmware or software) for the processor 14 to execute, such as instructions relating to determining a wait time recommendation. As such, the memory device 16 may store, for example, control software, look up tables, configuration data, and so forth, to facilitate determining a wait time recommendation. In some embodiments, the processor 14 and the memory device 16 may be external to the controller 12. The memory device 16 may include a tangible, non-transitory, machine-readable-medium, such as a volatile memory (e.g., a random access memory (RAM)) and/or a nonvolatile memory (e.g., a read-only memory (ROM), flash memory, hard drive, and/or any other suitable optical, magnetic, or solid-state storage medium).

The controller 12 may employ wait time recommendation logic that determines a wait time recommendation for an attraction 34 of the theme park. In particular, the wait time recommendation may include an indication that the wait time is shorter than expected, longer than expected, or as expected. The wait time recommendation may also include the expected (e.g., typical or usual) wait time, an indication of how much shorter or longer the wait time is than expected (e.g., presented in total time such as minutes saved or additional minutes to wait, or presented as a percentage (e.g., 10% shorter or longer than normal). It should be understood that the term "logic," as used in the present disclosure, may include hardware (such as circuitry), software (such as instructions stored in the memory 16 for execution by the processor 14), or a combination of the two. The wait time recommendation logic may use wait time historical data 22 as an input. The wait time historical data 22 may be stored in the memory 16 and/or provided in a database. For example, the wait time recommendation system 10 may include a database that stores the wait time historical data 22 and returns requested wait time historical data 22 in response to receiving a query from the wait time recommendation logic.

In one embodiment, the wait time recommendation logic may determine the wait time recommendation by determining a wait time value for an attraction. The wait time value may represent a proportion of the existing wait time for one attraction to the total wait time for all attractions in a theme park. As such, the wait time recommendation logic may determine the wait time value by dividing the existing wait time for the attraction by a total existing wait time for all attractions, e.g., at a current time or within a rolling window of time. The wait time value may be compared to one or more historical wait time values calculated in the same manner, but using wait time historical data 22. The historical total wait time may be an average of total wait times at for all attractions over any suitable time period or using a subset of historical wait time data points based on context information as provided herein (e.g., time points for a day, week, season, or year). In some embodiments, the historical total wait time may be an average of total wait times for time periods that correspond to the current time or day that the wait time recommendation is being requested for. For example, the historical total wait time may be an average of total wait times that correspond to the same dates (for multiple years), the same time (for multiple dates), similar weather (for multiple dates), similar characteristics (e.g., weekend wait times, holiday wait times, or a parade, show, or other performance occurring nearby), similar attraction statuses (e.g., attractions being closed) or any other similar suitable information that may affect wait time. Moreover, factors that may skew the historical total wait time may be accounted for, such as by adjusting a skewed historical total wait time to compensate for the skewing factors.

The wait time recommendation logic may then compare the wait time value to an expected or historical wait time value. The expected (e.g., typical or usual) wait time value may be a ratio based on historical wait time data of the attraction and the theme park, date or time information (such as the time of day, the day of the week, the week of the year, or the season), weather, and/or a characteristic of the attraction (such as whether the attraction is outdoor or indoor). For example, the expected or historical wait time value may be an expected wait time of the attraction divided by a total wait time for all attractions (as related to the expected wait time). The expected wait time of the attraction may be provided by the wait time historical data 22. In one embodiment, if the wait time value is less than the expected wait time value, the wait time recommendation logic may notify a guest's mobile device 24 that the wait time for the attraction is shorter than expected. On the other hand, the wait time value is greater than the expected wait time value, the wait time recommendation logic may notify the guest's mobile device 24 that the wait time is longer than expected. If the wait time value is not less than or greater than the expected wait time value, the wait time recommendation logic may determine that the wait time is as expected.

In some embodiments, the wait time recommendation logic may compare the wait time value to the expected wait time value using threshold values (e.g., ratios, percentages, or periods of time). As an example, the expected or historical wait time for an attraction may be 60 minutes in the context of a total historical wait time for all attractions being 600 minutes. As such, the expected or historical wait time value may be 60/600, or 10%. If a deviation of 5% is used to set the short wait time threshold value, then the short wait time threshold value may be defined as 5% (i.e., 10%–5%). Therefore, the wait time recommendation logic may send a notification to the guest's mobile device 24 that the wait time is shorter than expected if the wait time value is less than 5%. The long wait time threshold value may be similarly defined and applied. The deviation used for the short wait time threshold value and the long wait time threshold value may be any suitable deviation in the range of 1-50%. Moreover, in some embodiments, the threshold value may be customizable (e.g., by a developer, the theme park, or the guest). In some embodiments, the wait time recommendation logic may compare the wait time value to the expected wait time value without using threshold values. For example, the wait time recommendation logic may determine all deviations for all wait times from expected wait times for all attractions. The wait time recommendation logic may then display all the wait times or a subset (e.g., the top ten, top five, top three, or any suitable top number) of the wait times that deviate the greatest from their respective expected wait times.

It should be understood that while the present disclosure uses values to determine a wait time recommendation, any suitable numerical representation of wait times may be used, including the wait times themselves. For example, in some cases, the wait time historical data 22 may receive existing wait times for each attraction, and the existing wait times of attractions may be compared to expected or historical wait times (or a subset of historical wait times based on context, e.g., historical weekend wait times only, historical Tuesday wait times only) to determine a wait time recommendation. For the purposes of this example, if the expected wait time for an attraction is 60 minutes and a threshold deviation of 10 minutes is used to set the short wait time threshold value, then the short wait time threshold value is 50 minutes (i.e., 60 minutes−10 minutes). Therefore, the wait time recommendation logic may send a notification to the guest's mobile device 24 that the wait time is shorter than expected if the wait time is less than 50 minutes. The long wait time threshold value may be similarly defined and applied.

The expected wait time value may be determined and/or adjusted based on historical wait time data of the attraction and the theme park, and any suitable context information. In particular, the wait time recommendation logic may obtain or receive the context information based on, for example, the date or time corresponding to when a wait time recommendation is requested. The context information may include date or time information (e.g., the time of day, the day of the week, the week of the year, or the season), holiday or event dates (e.g., public holidays such as Thanksgiving or Christmas, school holidays such as spring break, or religious holidays such as Easter), weather information (e.g., related to temperature, humidity, chance or amount of rain, chance of natural disaster, or the like), a characteristic of the attraction (e.g., whether the attraction is outdoor or indoor), a parade, show, or other performance occurring nearby, geographical location of the mobile device 24 or proximity between the attraction and the mobile device 24, and/or any other suitable information that may affect or skew wait time. In some embodiments, the controller 12 may be programmed to obtain suitable or requested context information. In alternative or additional embodiments, the context information may be received from a variety of sources, such as a calendar software application, a weather software application, and/or a location determining software application.

As an example of the wait time recommendation logic using the context information, the wait time recommendation logic may determine the expected wait time value for a certain date by averaging historical expected wait time values associated with that date in previous years. As another example, the wait time recommendation logic may determine the expected wait time value for a certain time by averaging historical expected wait time values for that time for the previous 30 days. As yet another example, the wait time recommendation logic may determine the expected wait time value for a certain time by averaging historical expected wait time values taken when weather conditions substantially match weather conditions at the certain time (e.g., when the temperature is approximately the same (such as within one to five degrees Fahrenheit), when the humidity is approximately the same, when an amount of rain is approximately the same, or the like). As such, the wait time recommendation logic may take into account or adjust the expected wait time value based on date, time, weather, attraction characteristic, or any other suitable factor that may skew the expected wait time value. For example, if wait time historical data 22 corresponds to one or more attractions in the theme park being closed, the wait time historical data 22 may be skewed (as the remaining attractions would have inflated wait time values as no wait times would be associated with the closed attractions). In such a case, the wait time recommendation logic may estimate wait times for the closed attractions (e.g., based on the wait time historical data 22) to compensate for the closed attractions. Alternatively, the wait time recommendation logic may not use wait time historical data 22 that corresponds to closed attractions (or attractions that existed that are no longer in operation). While the present disclosure discusses that the wait time recommendation logic may determine the expected wait time, it should be understood that any suitable logic (e.g., external to the wait time recommendation logic) may determine the expected wait time.

Once the wait time recommendation logic determines that the wait time is shorter than expected, longer than expected, or as expected, the wait time recommendation logic may send a corresponding an indication or notification to the guest's mobile device 24 via a communication network 28. The communication network 28 may be wired and/or wireless, and enable the wait time recommendation logic to communicate with and/or send the indication or notification to the guest's mobile device 24 via any suitable communication protocol. For example, the communication network 28 may include a wireless network, such as a mobile network, WiFi, LAN, WAN, Internet, and/or the like.

The mobile device 24 may store and execute a wait time recommendation software application 30 that enables the mobile device 24 to display wait times and wait time recommendations for attractions of a theme park. It should be understood that certain features of the system 10 may be shared with duplicated or exchanged with one another. For example, the wait time recommendation software application 30 may be stored in a memory (e.g., sharing certain features of the memory 16) and executed by a processor (e.g., sharing certain features of the processor 14) of the mobile device 24. The mobile device 24 may use communication circuitry 33 (e.g., sharing certain features of the communication circuitry 17) to communicate with the controller 12 via the communication network 28.

In addition, the wait time recommendation system 10 includes a plurality of attractions 34 under the control of an attraction information system 35 and that use communication circuitry 36 to communicate with the controller 12 via the communication network 28. The wait time historical data 22 may be updated using wait time data from each individual attraction 34 and stored as the wait time historical data 22 as well as input used by the controller 12 to obtain existing wait times for the individual attractions 34 and that in turn is used to determine a collective or total existing wait time for all attractions (e.g., by summing all of the existing wait times of the attractions 34). In some embodiments, the wait time data may be determined manually. For example, employees of the theme park may monitor wait times for attractions of the theme park, and enter or send the wait times to the attraction information system 35 and/or the controller 12.

The attraction information system 35 may include a memory (e.g., sharing certain features of the memory 16) and may be under processor control (e.g., sharing certain features of the processor 14). The attraction may also include one or more sensors 38 that generate data used to determine the existing wait time for an individual attraction 34. In one embodiment, the sensors 38 may include guest tracking sensors (e.g., barcode or optical readers, NFC readers) that read identification information from the mobile device 24 at entry to the attraction line as well as when each guest enters the attraction itself and exits the line. In one embodiment, the existing wait time of each attraction 34 may be an average wait time of the last N guests (e.g., last 10 guests, last 50 guests). In another embodiment, the sensors 38 may include cameras or image sensors that, using image data of the line, estimate the line length and, in turn, estimate an existing wait time based on the estimated line length.

The wait time recommendation application 30 may receive wait time recommendation information (such as an indication or notification of a wait time recommendation) from the wait time recommendation logic and display a wait time recommendation based on the wait time recommendation information. In some embodiments, the wait time recommendation application 30 may be part of a larger software application, such as a software application used to provide theme park information to theme park guests. The mobile device 24 may be any suitable electronic device that receives a wait time recommendation, including a smartphone, a wearable device, a laptop, a tablet, or the like. In some embodiments, the mobile device 24 may instead be any other suitable device that may display or communicate the respective wait times, such as signage inside of the theme park, signage at each attraction, a posting on a web site associated with the theme park, or messaging via chat bot on a messaging platform.

In some embodiments, the wait time recommendation application 30 may provide and/or display the wait time recommendation based on user context information provided via a user interface or user input device 32 of the mobile device 24. The user context information 32 may include any suitable information that may facilitate providing a more relevant display of the wait time recommendation. In particular, the user context information 32 may include user preferences of the guest or their party (e.g., related to which attractions the guest or the guest's party desires or does not desire to attend, or attractions the guest or the guest's party is eligible or ineligible to attend based on age or height of the guest or member of the guest's party), location information (e.g., of the mobile device 24 as provided by location determining logic, such as Global Position System (GPS) hardware and/or software), and/or the like. For example, the wait time recommendation application 30 may evaluate wait times or display/push wait times only for those attractions that meet the user preferences and/or are within a threshold distance from the mobile device's 24 location. In one embodiment, the guest may set or configure what user context information 32 is provided and/or used to determine how the wait time recommendation is determined and/or displayed. The guest may then use the notification of whether the wait time is shorter or longer than expected as a factor in deciding whether to wait in a line for an attraction.

Figure 2:
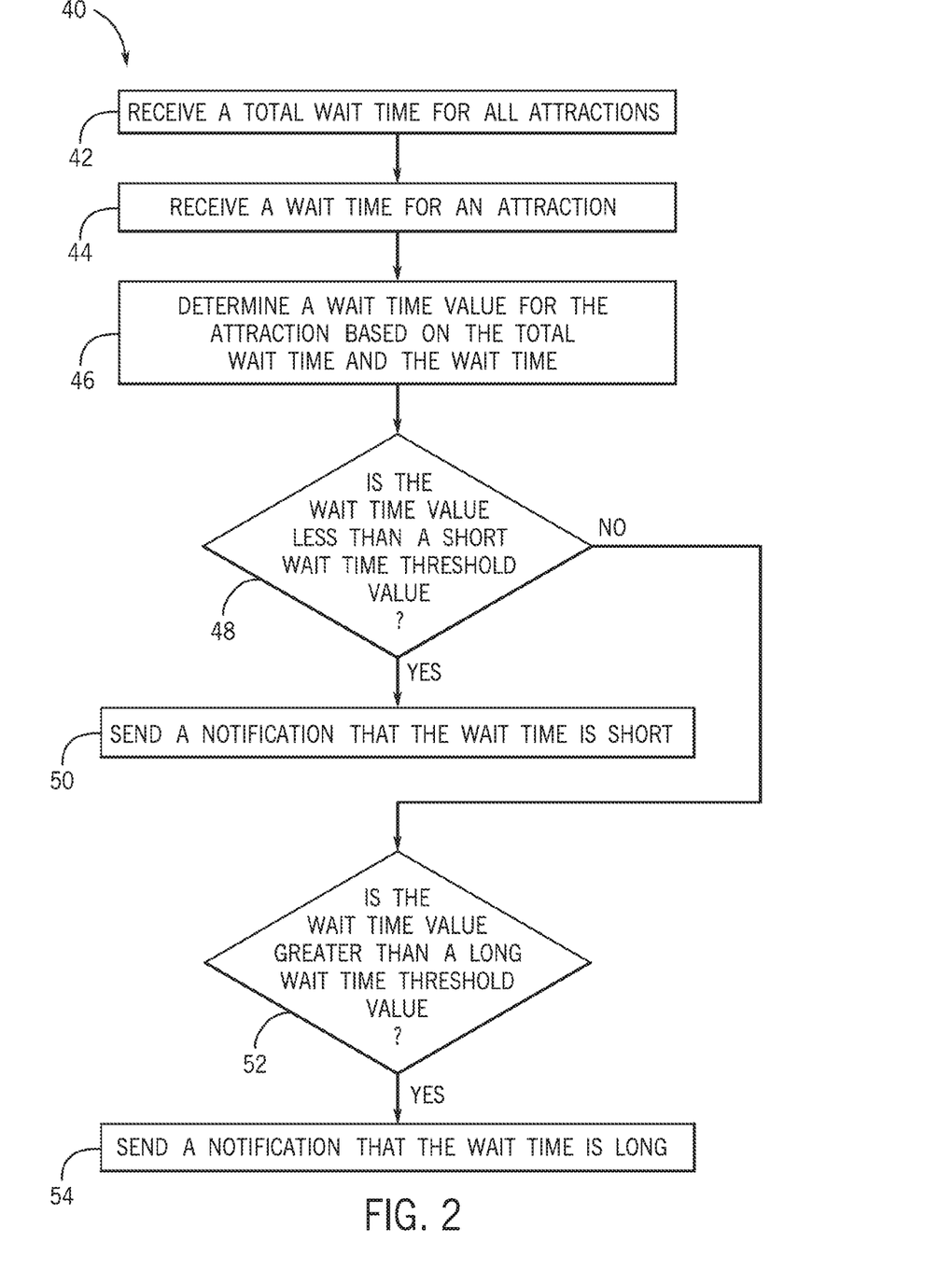
FIG. 2 is a flowchart of a process for generating a wait time recommendation for an attraction of a theme park a total wait time for multiple attractions of the theme park, according to embodiments of the present disclosure.

FIG. 2 is a flowchart of a process 40 for generating a wait time recommendation for an attraction of a theme park based on a total wait time for multiple attractions of the theme park, according to embodiments of the present disclosure. In particular, the wait time recommendation system 10 may implement the process 40 to generate a wait time recommendation. The process 40 may be in the form of one or more software applications that include instructions that are executed by at least one suitable processor, such as the processor 14 of the wait time recommendation system 10, via the wait time recommendation logic. The illustrated process 40 is merely provided as an example, and in other embodiments, certain illustrated steps of the process 40 may be performed in other orders, skipped, repeated, or not shown in FIG. 3, in accordance with the present disclosure.

As illustrated, in process block 42, the processor 14 receives a total wait time for multiple attractions of a theme park. The multiple attractions of the theme park may include all attractions of the theme park or all attractions of the theme park that are in operation. The total wait time may be an average of total wait times at for all attractions over any suitable time period (e.g., a day, week, season, or year). In particular, the total wait time may be provided by the wait time historical data 22. In some embodiments, the total wait time may be an average of total wait times for time periods that correspond to the current time or day that the wait time recommendation is being requested for. For example, the total wait time may be an average of total wait times that correspond to the same date (for multiple years), the same time (for multiple dates), similar weather (for multiple dates), and/or other similar characteristics.

In some embodiments, the processor 14 may take into account or adjust the total wait time based on date, time, weather, attraction characteristic, or any other suitable factor that may skew the expected wait time value. For example, if wait time historical data 22 corresponds to one or more attractions in the theme park being closed, the wait time historical data 22 may be skewed (as the remaining attractions would have inflated wait time values as no wait times would be associated with the closed attractions). In such a case, the wait time recommendation logic may estimate wait times for the closed attractions (e.g., based on the wait time historical data 22) to compensate for the closed attractions. Alternatively, the wait time recommendation logic may not use wait time historical data 22 that corresponds to closed attractions (or attractions that existed that are no longer in operation).

In process block 44, the processor 14 receives a wait time for an attraction. For example, the wait time may be provided by timers or counters of the attractions 34 or may be manually entered.

In process block 46, the processor 14 determines a wait time value for the attraction based on the total wait time for all attractions of the theme park and the wait time for the attraction. The wait time value may represent a proportion of the wait time for the attraction to the total wait time for all attractions of the theme park. In particular, the wait time recommendation logic may determine the wait time value by dividing the wait time for the attraction by the total wait time for all attractions. The wait time value may be expressed as a fraction, a decimal, or a percent.

In decision block 48, the processor 14 determines whether the wait time value is less than a short wait time threshold value. The short wait time threshold value may be based on an expected wait time value for the attraction. The expected (e.g., typical or usual) wait time value may be a ratio based on historical wait time data of the attraction and the theme park, date or time information (such as the time of day, the day of the week, the week of the year, or the season), weather, and/or a characteristic of the attraction (such as whether the attraction is outdoor or indoor). For example, the expected wait time value may be an expected wait time of the attraction divided by a total wait time for all attractions (as related to the expected wait time). The expected wait time of the attraction may be provided by the wait time historical data 22. The short wait time threshold value, then, may be determined by subtracting a threshold period of time from the expected wait time. The threshold period of time may be any suitable period of time (e.g., from thirty seconds to thirty minutes, one minute, five minutes, or ten minutes) or may be a threshold percentage (e.g., a range of 0.1 to 10%, or 1 to 5%).

In process block 50, if the processor 14 determines that the wait time value is less than the short wait time threshold value, then the processor 14 sends a notification that the wait time for the attraction is short. In particular, the processor 14 may send a notification to the wait time recommendation software application 30 on the guest's mobile device 24 that the wait time is shorter than expected. In one embodiment, the processor 14 ranks all of the attraction wait times based on a comparison to expected wait times. For example, a ranking may identify a subset of attractions that are a best value relative to their expected or historical wait time values. The wait time recommendation system 10 may push the subset of best value attractions via a notification to the guest mobile device 24. The ranking may be based on total minutes saved in one embodiment. For example, if an attraction is typically a 45 minute wait on a weekend, but the existing wait time is 35 minutes, that attraction may be ranked higher than an attraction with a lower absolute wait time (e.g., 15 minutes) that is 5 minutes lower than normal.

In decision block 52, if the processor 14 determines that the wait time value is not less than the short wait time value threshold value, then the processor 14 determines whether the wait time value is greater than a long wait time value threshold value. The long wait time threshold may be determined by adding a threshold period of time to the expected wait time. It should be noted that the threshold period of time subtracted from the expected wait time to determine the short wait time threshold may or may not be equal to the threshold period of time added to the expected wait time to determine the long wait time threshold.

In process block 54, if the processor 14 determines that the wait time value is greater than the long wait time threshold value, then the processor 14 sends a notification that the wait time for the attraction is long. In particular, the processor 14 may send a notification to the wait time recommendation software application 30 on the guest's mobile device 24 that the wait time is longer than expected. In some embodiments, if the processor 14 determines that the wait time value is not less than the short wait time threshold value (from decision block 48) and is not greater than the long wait time value threshold value, the processor 14 may send a notification to the wait time recommendation software application 30 on the guest's mobile device 24 that the wait time is as expected. The processor 14 may provide multiple recommendations corresponding to multiple attractions. In one embodiment, the processor 14 may list the multiple recommendations in a ranked order as to prioritize the lines with the shortest wait time or the greatest savings of wait time when compared to the expected wait time. The processor 14 may not provide any recommendations if the wait time value is not less than the short wait time threshold value nor greater than the long wait time threshold value (thus indicating that guests of the theme park are evenly distributed among the attractions).

In some embodiments, the processor 14 may compare the wait time value to the expected wait time value without using threshold values. For example, the processor 14 may determine all deviations for all wait times from expected wait times for all attractions. The wait time recommendation logic may then display all the wait times or a subset (e.g., the top ten, top five, top three, or any suitable top number) of the wait times that deviate the greatest from their respective expected wait times. In this manner, the processor 14 may implement the process 40 to generate a wait time recommendation for an attraction of a theme park based on a total wait time for multiple attractions of the theme park.

Figure 3:
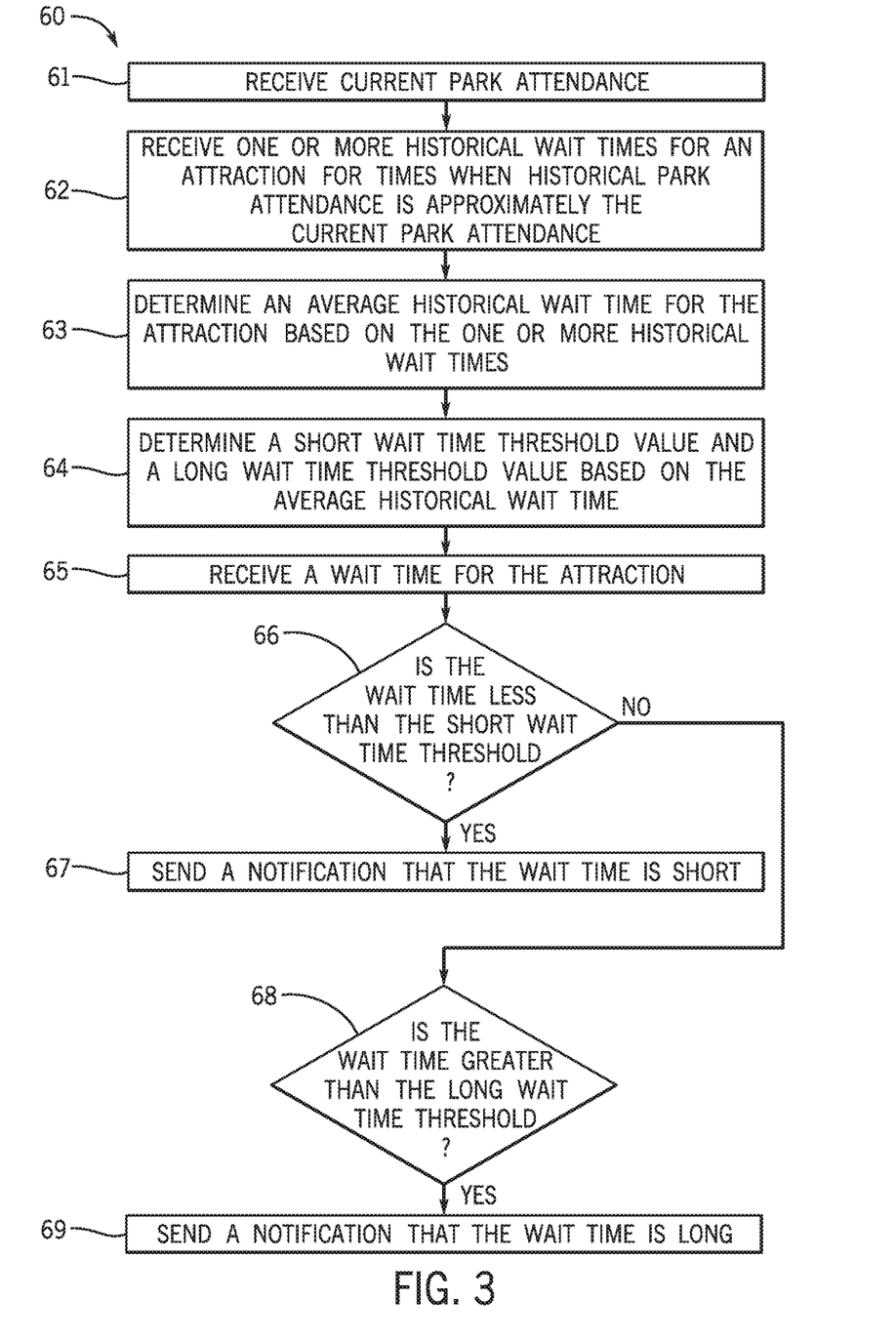
FIG. 3 is a flowchart of a process for generating a wait time recommendation for an attraction of a theme park based on park attendance, according to embodiments of the present disclosure.

In some embodiments, the wait time recommendation may be generated based on other factors, in addition or as an alternative to the total wait time for multiple attractions of the theme park. For example, FIG. 3 is a flowchart of a process 60 for generating a wait time recommendation for an attraction of a theme park based on park attendance, according to embodiments of the present disclosure. In particular, the wait time recommendation system 10 may implement the process 60 to generate the wait time recommendation. The process 60 may be in the form of one or more software applications that include instructions that are executed by at least one suitable processor, such as the processor 14 of the wait time recommendation system 10, via the wait time recommendation logic. The illustrated process 40 is merely provided as an example, and in other embodiments, certain illustrated steps of the process 40 may be performed in other orders, skipped, repeated, or not shown in FIG. 3, in accordance with the present disclosure.

As illustrated, in process block 61, the processor 14 receives a current park attendance for the theme park. In process block 62, the processor 14 receives one or more historical wait times for an attraction for times when the corresponding historical park attendance is approximately the current park attendance. The one or more historical wait times may be provided by the wait time historical data 22. In some embodiments, the processor 14 may include or exclude historical wait times that are associated with skewed historical park attendance (e.g., due to attractions being closed, weather, holiday or event dates, a parade, show, or other performance occurring nearby, or any other suitable information that may affect or skew wait time). In one embodiment, the processor 14 may adjust historical wait times associated with skewed historical park attendance. The processor 14 may determine that historical park attendance is approximately the current park attendance if the historical park attendance is within a threshold attendance of the current park attendance. The threshold attendance may be any suitable attendance (e.g., a range of 1 to 10000 people, 1 to 1000 people, or 1 to 100 people) or any suitable percentage of the current park attendance (e.g., a range of 0.1 to 10%, or 1 to 5%).

In process block 63, the processor 14 determines an average historical wait time for the attraction based on the one or more historical wait times. That is, the processor 14 may average the one or more historical wait times for the attraction to determine the average historical wait time. In additional or alternative embodiments, another representative value may be used, such as a median, mode, minimum, or maximum.

In process block 64, the processor 14 determines a short wait time threshold and a long wait time threshold based on the average historical wait time. The short wait time threshold may be determined by subtracting a threshold period of time from the average historical wait time, while the long wait time threshold may be determined by adding the threshold period of time to the average historical wait time. The threshold period of time may be any suitable period of time (e.g., from thirty seconds to thirty minutes, one minute, five minutes, or ten minutes) or may be a threshold percentage (e.g., a range of 0.1 to 10%, or 1 to 5%).

In process block 65, the processor 14 receives a wait time for the attraction. For example, the wait time may be provided by timers or counters of the attractions 34 or may be manually entered.

In decision block 66, the processor 14 determines whether the wait time is less than the short wait time threshold. If so, in process block 67, the processor 14 sends a notification that the wait time for the attraction is short. In particular, the processor 14 may send a notification to the wait time recommendation software application 30 on the guest's mobile device 24 that the wait time is shorter than expected.

If the processor 14 determines that the wait time is not less than the short wait time threshold, then in decision block 68, the processor 14 determines whether the wait time is greater than the long wait time threshold. If so, in process block 69, the processor 14 sends a notification that the wait time for the attraction is long. In particular, the processor 14 may send a notification to the wait time recommendation software application 30 on the guest's mobile device 24 that the wait time is longer than expected.

In some embodiments, if the processor 14 determines that the wait time value is not less than the short wait time threshold (from decision block 66) and is not greater than the long wait time value threshold, the processor 14 may send a notification to the wait time recommendation software application 30 on the guest's mobile device 24 that the wait time is as expected. In this manner, the processor 14 may implement the process 60 to generate a wait time recommendation for an attraction of a theme park based on park attendance.

Figure 4:
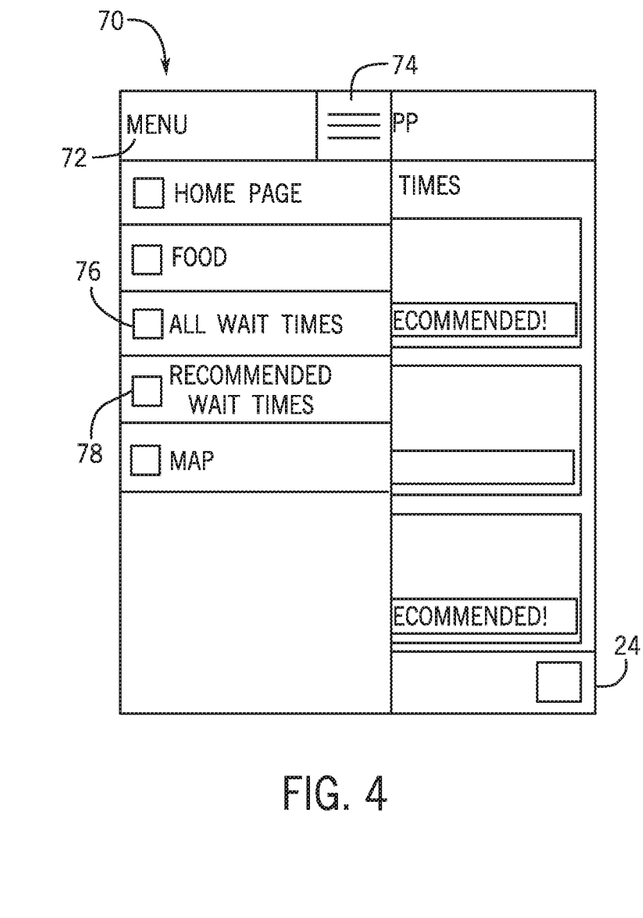
FIG. 4 is an example screenshot of a theme park software application used to provide theme park information to theme park guests, according to embodiments of the present disclosure.

With the foregoing in mind, FIG. 4 is an example screenshot of a theme park software application 70 used to provide theme park information to theme park guests, according to embodiments of the present disclosure. In particular, the theme park software application 70 may be stored and executed on a guest's mobile device 24. As illustrated, the theme park software application 70 may display a menu 72 when, for example, a guest selects a menu button 74. The menu 72 may display a variety of options, including displaying an all wait times page 76 (titled "All Wait Times") that displays all wait times for all attractions of the theme park, and displaying a recommended wait times 78 (titled "Recommended Wait Times") that displays recommended wait times for attractions of the theme park.

Figure 5:
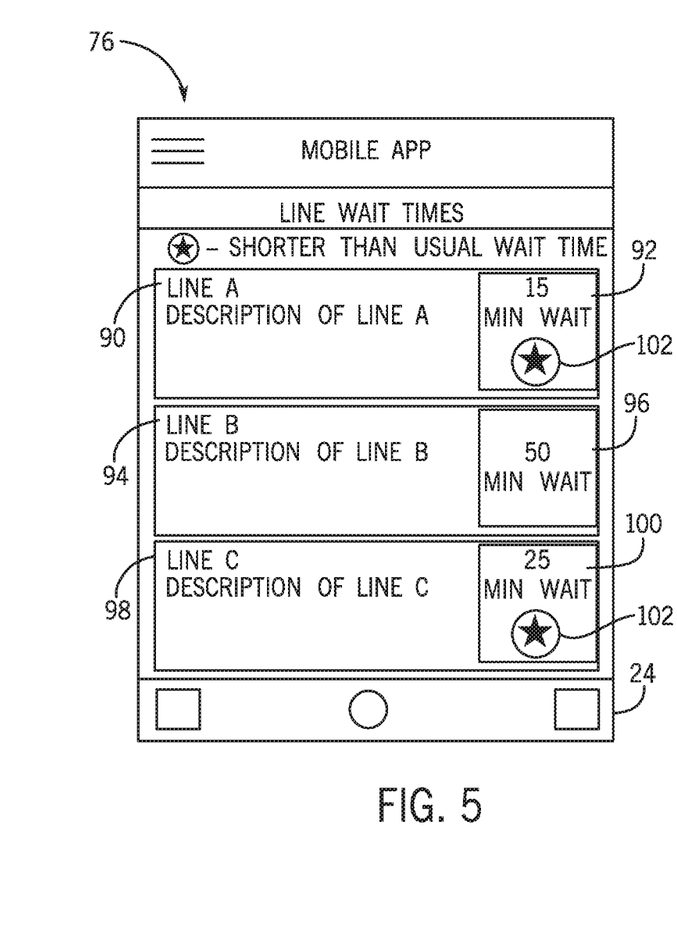
FIG. 5 is an example screenshot of the all wait times page of the theme park software application of FIG. 4 with graphical notifications of shorter than usual wait times, according to embodiments of the present disclosure.

While the all wait times page 76 may display all wait times for all attractions of the theme park, in some embodiments, the page 76 may also display recommended wait times. For example, FIG. 5 is an example screenshot of the all wait times page 76 of the theme park software application 70 of FIG. 4 with graphical notifications of shorter than usual wait times, according to embodiments of the present disclosure. In some embodiments, the wait time recommendation software application 30 may provide the information displayed on the all wait times page 76. For example, the wait time recommendation software application 30 may be part of the theme park software application 70. The all wait times page 76 displays wait times for lines of attractions at the theme park. As illustrated, Line A 90 has a wait time 92 of 15 minutes, Line B 94 has a wait time 96 of 50 minutes, and Line C 98 has a wait time 100 of 25 minutes. Moreover, the all wait times page 76 may provide a graphical indication 102 to notify the guest that a line has a shorter or longer than usual wait time. For example, the all wait times page 76 displays the graphical indication 102 for both Line A 90 and Line C 98 to indicate that these lines have shorter than usual wait times. In some embodiments, the all wait times page 76 may also include an indication to notify the guest that a line has a longer than usual wait time. It should be noted that the graphical notification may be provided in any suitable format, such as clip art, an emoji, an icon, or the like.

In some embodiments, the all wait times page 76 may include an option to display preferred wait times or the theme park software application 70 may include a preferred wait times page that displays wait times for attractions of the theme park based on the guest's preferences. For example, the theme park software application 70 may receive the guest's preferences for certain attractions (e.g., as part of the user context information 32). The theme park software application 70 may then instruct the wait time recommendation system 10 to evaluate only wait times for rides that are indicated as preferred by the guest, or display only wait times for rides that are indicated as preferred by the guest. As another example, the theme park software application 70 may receive the mobile device's 24 location and/or distance from attractions (e.g., as part of the user context information 32), and then instruct the wait time recommendation system 10 to evaluate only wait times for rides that are within a threshold distance from the mobile device 24, or display only wait times for rides that are within a threshold distance from the mobile device 24. In some embodiments, the theme park software application 70 may instruct the wait time recommendation system 10 to weigh a number of factors, including the wait time, the difference between the wait time in the line and the expected wait time for the line, the guest's preferences, and/or the mobile device's 24 location, to determine which wait times to display as preferred wait times. Similarly, the all wait times page 76 may include any suitable options to sort or filter wait times, such as by wait times, by the difference between the wait time in the line and the expected wait time for the line, by a ratio of the difference between the wait time in the line and the expected wait time for the line to the expected wait time, or the like.

Figure 6:
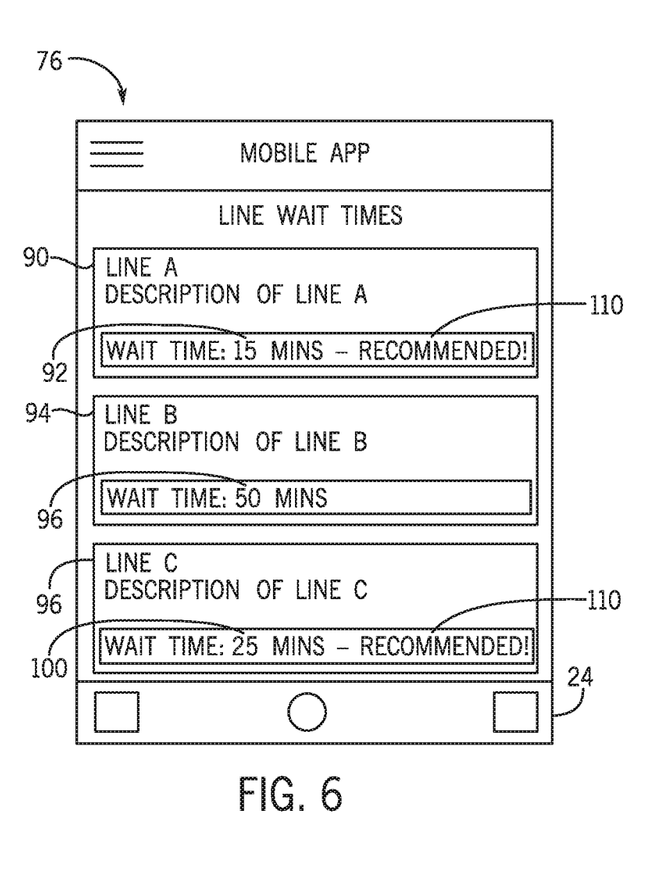
FIG. 6 is another example screenshot of the all wait times page of the theme park software application of FIG. 4 with text-based indications of shorter than usual wait times, according to embodiments of the present disclosure.

As illustrated in FIG. 5, the graphical indication 102 is in the form of an icon or graphical image. In alternative or additional embodiments, indications may be in the form of text. For example, FIG. 6 is another example screenshot of the all wait times page 76 of the theme park software application 70 of FIG. 4 with text-based indications or markers of shorter than usual wait times, according to embodiments of the present disclosure. In particular, FIG. 6 illustrates a text-based indication or marker 110 (e.g., "Recommended!"). While FIGS. 5 and 6 display indications in the forms of icons and text, respectively, it should be understood that the indication 102 may displayed in any suitable format. For example, the text-based marker 110 may have a different font style (e.g., bolded, italicized, or capitalized) and/or be displayed differently (e.g., differently colored or using flashing effects) than other text on the all wait times page 76 to draw attention to the marker 110.

Figure 7:
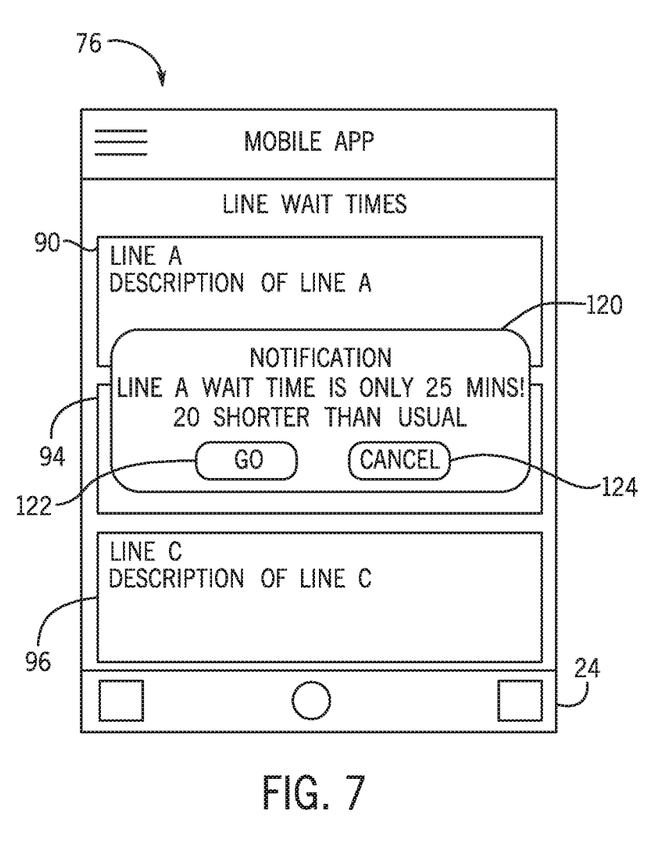
FIG. 7 is yet another example screenshot of the all wait times page of the theme park software application of FIG. 4 as an attraction's line's wait time transitions to a shorter than usual wait time, according to embodiments of the present disclosure.

Additionally, as a line's or attraction's wait time changes status, e.g., from an expected wait to a shorter than expected wait time, the theme park software application 70 and/or the wait time recommendation software application 30 may provide a larger or more noticeable notification (e.g., a push notification) to bring the guest's attention to the change in status. For example, FIG. 7 is yet another example screenshot of the all wait times page 76 of the theme park software application 70 of FIG. 4 as a line's wait time transitions to a shorter than usual wait time, according to embodiments of the present disclosure. As illustrated, Line A 90 transitions from an expected wait time to a shorter than usual wait time. As such, a notification prompt 120 is displayed to inform the guest of this transition. In particular, the notification prompt 120 may be "pushed" or initiated by the wait time recommendation system 10 to be displayed on the mobile device 24. The notification prompt 120 also enables the guest to indicate that they will be getting in Line A 90 via the "Go" button 122 or indicate that they will not be getting in Line A 90 via the "Cancel" button 124. In this manner, the theme park software application 70 and/or the wait time recommendation software application 30 may provide wait time recommendations to a guest.

Figure 8:
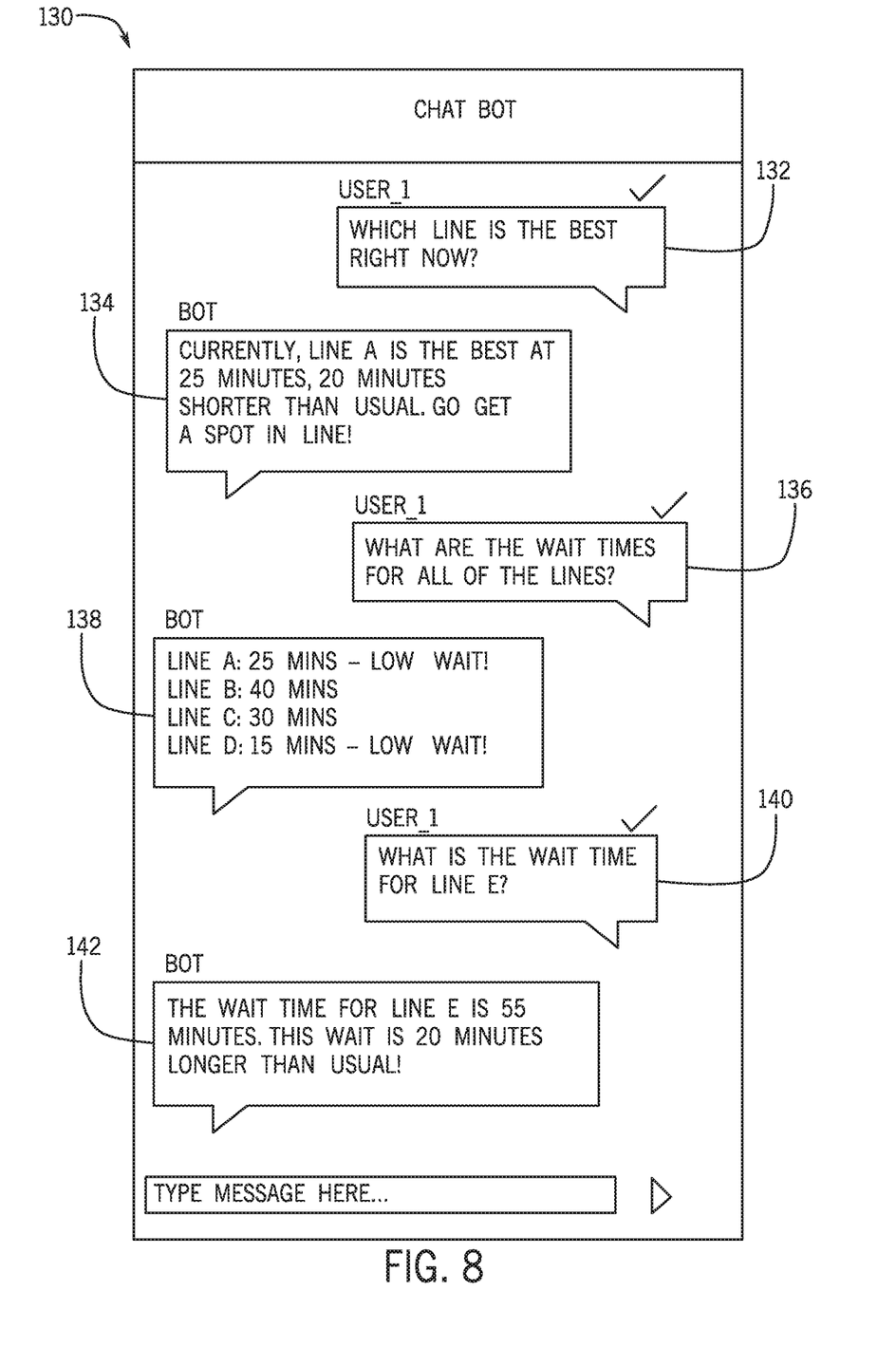
FIG. 8 is an example screenshot of a chat user interface that may provide a wait time recommendation, according to embodiments of the present disclosure.

In some embodiments, the wait time recommendation may be provided via a chat or messaging interface (e.g., stored and executing on the mobile device 24). For example, FIG. 8 is an example screenshot of a chat interface 130 that may provide a wait time recommendation, according to embodiments of the present disclosure. The chat interface 130 may be provided by any suitable chat or messaging platform, such as short message service, a messaging software application, an instant messaging software application, a component of the wait time recommendation software application 30, or a component of the theme park software application 70, executing on the mobile device 24. The chat interface 130 may communicatively to a bot (e.g., a chat bot) or other suitable software application or artificial intelligence that conducts a conversation with a guest via textual (or auditory) communication, operated by, for example, the processor 14 and provided by the wait time recommendation logic.

The chat interface 130 may provide the wait time recommendation via the wait time recommendation system 10 in response to a request by the guest. For example, the guest may send a message 132 requesting the "best" line (e.g., "Which line is the best right now?"). The chat bot may query the wait time recommendation system 10 for the line with the shortest wait time, with the greatest difference between the (current) wait time in the line and the expected wait time for the line, or the greatest ratio of the wait time in the line and the expected wait time for the line, and display a response 134 indicating the result.

In some embodiments, the chat bot may incorporate the guest's preferences for certain attractions (e.g., as part of the user context information 32) into its response 134. For example, the chat bot may instruct the wait time recommendation system 10 to evaluate only wait times for rides that are indicated as preferred by the guest, or respond with only wait times for rides that are indicated as preferred by the guest. As another example, the chat bot may incorporate the mobile device's 24 location and/or distance from attractions (e.g., as part of the user context information 32) into its response 134. In particular, the chat bot may instruct the wait time recommendation system 10 to evaluate only wait times for rides that are within a threshold distance from the mobile device 24, or respond with only wait times for rides that are within a threshold distance from the mobile device 24. In some embodiments, the chat bot may instruct the wait time recommendation system 10 to weigh a number of factors, including the wait time, the difference between the wait time in the line and the expected wait time for the line, the guest's preferences, and/or the mobile device's 24 location, to determine the "best" line. As illustrated, the chat bot's response 134 indicates which line is "best," as well as the difference between the wait time in the line and the expected wait time for the line (e.g., "Currently, Line A is the best at 25 minutes, 20 minutes shorter than usual.").

As another example, the guest may send a message 136 requesting the wait times for all lines (e.g., "What are the wait times for all of the lines?"). The chat bot may query the wait time recommendation system 10 for the wait times for all lines at the theme park, as well as indications of whether any of the wait times are less than expected, and display a response 138 indicating the result. As illustrated, the chat bot's response 138 displays the wait times for all lines, as well as the wait times that are less than expected or "Low Wait" lines (e.g., "Line A: 25 mins—Low Wait!; Line B: 40 mins; Line C: 30 mins; Line D: 15 mins—Low Wait!").

The guest may also send a message 140 requesting the wait times for a specific line (e.g., "What is the wait time for Line E?"). The chat bot may query the wait time recommendation system 10 for the wait time for this line, as well as an indication of whether the wait time is less than expected, greater than expected, or as expected, and display a response 142 indicating the result. As illustrated, the chat bot's response 142 displays the wait time for the requested line, as well as an indication that the wait time is greater than expected (e.g., "The wait time for Line E is 55 minutes. This wait is 20 minutes longer than usual!"). While FIG. 8 is illustrated in the form of a chat or messaging interface, it should be understood the disclosed techniques may be applied to any other suitable communication format associated with artificial intelligence or a bot (e.g., a chat bot), such as a virtual assistant or a smart speaker.

Figure 9:
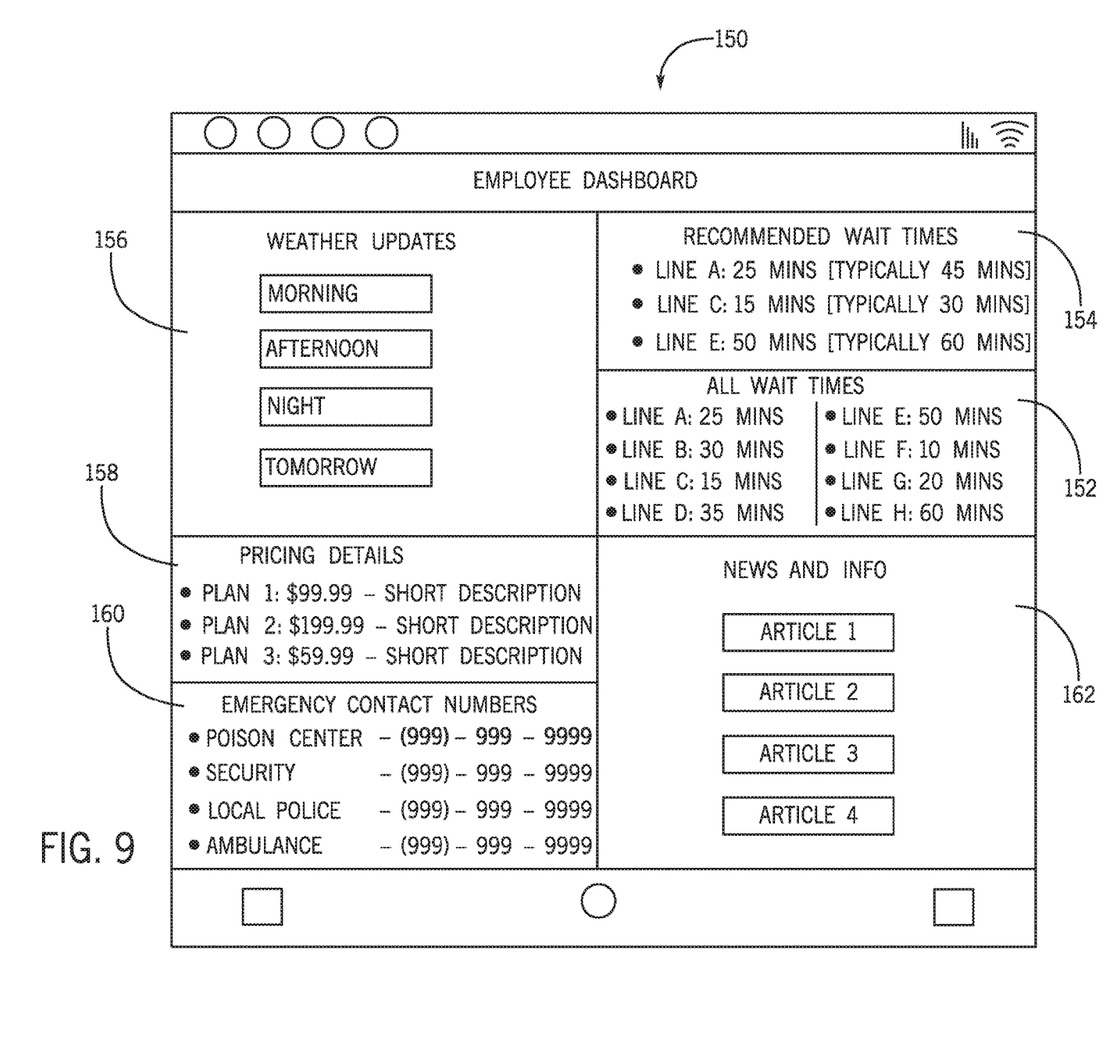
FIG. 9 is an example screenshot of an employee dashboard that may provide wait times and wait time recommendations, according to embodiments of the present disclosure.

Guest services employees (e.g., of the theme park) may also use a software application or interface that enables the guest services employees to view wait times and wait time recommendations. For example, FIG. 9 is an example screenshot of an employee dashboard 150 that may provide wait times and wait time recommendations, according to embodiments of the present disclosure. The employee dashboard 150 may be provided by any suitable platform, such as the wait time recommendation software application 30, the theme park software application 70, or a standalone employee dashboard software application, executing on any suitable electronic device, such as a computing device (e.g., a desktop computer, laptop, tablet, smartphone, or wearable device) of the theme park or a guest services employee.

As illustrated, the employee dashboard 150 may display wait times of lines of attractions in an "All Wait Times" window 152. The employee dashboard 150 may also display wait time recommendations in a "Recommended Wait Times" window 154. In this manner, the employee dashboard 150 may enable the guest services employee to quickly and conveniently retrieve information related to wait times and/or the most efficient, convenient, and/or time-saving attractions to wait in line for. Indeed, the employee dashboard 150 may enable the guest services employee to contact guests, e.g., via a services desk or via roaming employees, to recommend wait times for attractions, providing a personal touch and useful information to the guest. As further illustrated, the employee dashboard 150 also may display other convenient information that may be requested by the guest or facilitate servicing the guest, such as weather updates 156, theme park ticket plan pricing details 158, emergency contact numbers 160, and news and other information 162.

While the disclosed embodiments illustrate recommendations for the same types of lines (e.g., regular ticketholder or standby lines), the present disclosure contemplates applying the disclosed techniques to different and multiple types of lines, such as express lines, season ticketholder lines, VIP lines, and/or disability access lines. In particular, the wait time recommendations may be provided for these other types of lines and/or factor in additional wait time based on these other types of lines.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A wait time recommendation system comprising:
a sensor configured to detect a location of an electronic device within a theme park comprising a plurality of attractions;
a processor;
a memory storing instructions that, when executed by the processor, cause the processor to:
determine a set of attractions of the plurality of attractions within a threshold distance of the location of the electronic device;
receive a first existing wait time, corresponding to a first attraction of the set of attractions and a second existing wait time corresponding to a second attraction of the set of attractions;
determine a first wait time ratio between the first existing wait time and an existing total wait time of the plurality of attractions;
determine a second wait time ratio between the second existing wait time and the existing total wait time of the plurality of attractions;
generate a first wait time recommendation for the first attraction based on comparing the first wait time ratio and a first wait time threshold value of the first attraction; and
generate a second wait time recommendation for the second attraction based on comparing the second wait time ratio and a second wait time threshold value of the second attraction; and
communication circuitry configured to send a first indication of the first wait time recommendation for the first attraction and a second indication of the second wait time recommendation for the second attraction to a wait time recommendation software application of the electronic device.

2. The wait time recommendation system of claim 1, wherein the communication circuitry is configured to push the first indication as a notification to the wait time recommendation software application when the first wait time recommendation comprises indicating that the first existing wait time of the first attraction is shorter than expected.

3. The wait time recommendation system of claim 1, wherein the first wait time ratio comprises a percentage of the existing total wait time represented by the first existing wait time of the first attraction.

4. The wait time recommendation system of claim 3, wherein the first wait time recommendation is that the first existing wait time of the first attraction is shorter than expected based upon determining that the first wait time ratio is below the first wait time threshold value.

5. The wait time recommendation system of claim 3, wherein the first wait time recommendation is that the first existing wait time of the first attraction is longer than expected based upon determining that the first wait time ratio is above the first wait time threshold value.

6. The wait time recommendation system of claim 1, wherein the first wait time threshold value of the first attraction is derived from a relationship between historical total wait times of the plurality of attractions and historical wait times of the first attraction.

7. The wait time recommendation system of claim 6, wherein the processor is configured to receive context information, and wherein a subset of the historical total wait times of the plurality of attractions are used to determine the relationship, wherein the subset is selected based on the context information.

8. The wait time recommendation system of claim 7, wherein the context information comprises a day of a week, wherein the subset of the historical wait times is selected based on the day of the week.

9. The wait time recommendation system of claim 1, wherein the first wait time threshold value of the first attraction comprises a first short wait time threshold value, wherein the first wait time recommendation is that the first existing wait time of the first attraction is shorter than expected upon determining that the first wait time ratio is below the first short wait time threshold value.

10. The wait time recommendation system of claim 1, wherein the first wait time threshold value of the first attraction comprises a first long wait time threshold value, wherein the first wait time recommendation is that the first existing wait time of the first attraction is longer than expected upon determining that the first wait time ratio is above the first long wait time threshold value.

11. The wait time recommendation system of claim 1, wherein the electronic device is configured to communicate user context information to the processor, wherein the processor is configured to generate the first wait time recommendation and the second wait time recommendation based in part on the user context information.

12. The wait time recommendation system of claim 11, wherein the user context information comprises one or more user attraction preferences associated with the plurality of attractions, wherein the processor is configured to send the first indication of the first wait time recommendation and the second indication of the second wait time recommendation to the electronic device when the first attraction and the second attraction are associated with the user attraction preferences.

13. The wait time recommendation system of claim 11, wherein the user context information comprises the location of the electronic device within the theme park.

14. The wait time recommendation system of claim 1, wherein the wait time recommendation software application is configured to:
display the first existing wait time and the second existing wait time; and
display that the first existing wait time of the first attraction is shorter than expected, longer than expected, or as expected based on the first wait time recommendation using a graphical or text-based marker.

15. A tangible, non-transitory, computer-readable medium, comprising instructions for generating a wait time recommendation for an attraction of a plurality of attractions of a theme park that, when executed by a processor, cause the processor to:
receive, from a sensor, a location of an electronic device within the theme park;
determine one or more attractions of the plurality of attractions within a threshold distance of the location of the electronic device;
receive a total wait time for the plurality of attractions of the theme park;
receive one or more wait times, wherein each wait time of the one or more wait times corresponds to a respective attraction of the one or more attractions;

determine a wait time ratio for an individual attraction of the one or more attractions, wherein the wait time ratio is based on the total wait time for the plurality of attractions and a wait time of the one or more wait times for the individual attraction;

generate a wait time recommendation for the individual attraction based on a comparison of the wait time ratio and a threshold value associated with the individual attraction; and send a notification of a short wait time for the individual attraction in response to the comparison of the wait time ratio being below the threshold value.

16. The computer-readable medium of claim 15, wherein the instructions cause the processor to determine the wait time ratio by dividing the wait time for the individual attraction by the total wait time for the plurality of attractions.

17. The computer-readable medium of claim 15, wherein the instructions cause the processor to:

receive an expected wait time for the one or more attractions within the threshold distance of the location of the electronic device; and determine the threshold value based on dividing an average historical wait time for the one or more attractions within the threshold distance of the location of the electronic device by an average historical total wait time for the plurality of attractions.

* * * * *